United States Patent
Shimamoto et al.

(10) Patent No.: US 11,055,999 B2
(45) Date of Patent: Jul. 6, 2021

(54) VEHICLE CONTROL APPARATUS, VEHICLE CONTROL METHOD, AND STORAGE MEDIUM

(71) Applicant: HONDA MOTOR CO., LTD., Tokyo (JP)

(72) Inventors: Gaku Shimamoto, Wako (JP); Junpei Noguchi, Wako (JP); Kenya Sakurai, Wako (JP); Rikuro Shiraishi, Nagoya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/099,879

(22) Filed: Nov. 17, 2020

(65) Prior Publication Data

US 2021/0158702 A1 May 27, 2021

(30) Foreign Application Priority Data

Nov. 21, 2019 (JP) .............................. JP2019-210598

(51) Int. Cl.
*G08G 1/14* (2006.01)
(52) U.S. Cl.
CPC ...................... *G08G 1/14* (2013.01)

(58) Field of Classification Search
CPC ........................................................ G08G 1/14
See application file for complete search history.

(56) References Cited

U.S. PATENT DOCUMENTS

| 10,831,187 | B2 | 11/2020 | Bourassi et al. | |
|---|---|---|---|---|
| 2014/0121883 | A1* | 5/2014 | Shen | B62D 15/0285 701/28 |
| 2018/0374002 | A1* | 12/2018 | Li | G06F 3/017 |
| 2019/0018404 | A1 | 1/2019 | Bourassi et al. | |
| 2019/0039606 | A1* | 2/2019 | Fujita | B60W 50/14 |
| 2019/0184981 | A1* | 6/2019 | Jung | G05D 1/0221 |

FOREIGN PATENT DOCUMENTS

JP 2019-514088 A 5/2019

* cited by examiner

*Primary Examiner* — Daryl C Pope
(74) *Attorney, Agent, or Firm* — Thomas | Horstemeyer, LLP

(57) ABSTRACT

A vehicle control apparatus is configured to be capable of controlling movement and parking of a vehicle based on an operation from an operation terminal. The vehicle control apparatus comprises a processing unit configured to execute processing in a virtual parking control mode in which a virtual vehicle displayed on a screen is virtually operated by the operation from the operation terminal and processing in a remote parking control mode in which the vehicle is moved to a parking position and parked at the parking position based on the operation from the operation terminal.

10 Claims, 4 Drawing Sheets

FIG. 5

VEHICLE CONTROL APPARATUS, VEHICLE CONTROL METHOD, AND STORAGE MEDIUM

This application claims priority to and the benefit of Japanese Patent Application No. 2019-210598 filed on Nov. 21, 2019, the entire disclosure of which is incorporated herein by reference.

BACKGROUND OF THE INVENTION

Field of the Invention

The present invention relates to a vehicle control apparatus, a vehicle control method, and a storage medium and, more particularly, to a remote control technique for a vehicle.

Description of the Related Art

Japanese Patent Laid-Open No. 2019-514088 discloses a technique of remotely controlling a vehicle by an operation from a portable terminal.

In the arrangement of Japanese Patent Laid-Open No. 2019-514088, however, if a user has no learning experience of bodily feeling the behavior of a vehicle concerning vehicle control of moving a vehicle to a predetermined parking position by an operation from a portable terminal, it may be impossible to perform smooth vehicle control because a gap may be generated between an operation from the portable terminal and the behavior of the vehicle corresponding to the operation.

The present invention provides a vehicle control technique by which it is possible to smoothly performing vehicle control of moving a vehicle to a predetermined parking position by an operation from an operation terminal and parking the vehicle at the parking position.

SUMMARY OF THE INVENTION

According to one aspect of the present invention, there is provided a vehicle control apparatus capable of controlling movement and parking of a vehicle based on an operation from an operation terminal, comprising:

a processing unit configured to execute processing in a virtual parking control mode in which a virtual vehicle displayed on a screen is virtually operated by the operation from the operation terminal and processing in a remote parking control mode in which the vehicle is moved to a parking position and parked at the parking position based on the operation from the operation terminal, wherein the processing unit registers learning completion information as a learning history of a user of the operation terminal if the processing in the virtual parking control mode is executed, and in a state before the learning completion information is registered, limits execution of the remote parking control mode, and after registration of the learning completion information, cancels execution limitation of the remote parking control mode.

According to another aspect of the present invention, there is provided a vehicle control method in a vehicle control apparatus capable of controlling movement and parking of a vehicle based on an operation from an operation terminal, comprising:

a processing step of executing processing in a virtual parking control mode in which a virtual vehicle displayed on a screen is virtually operated by the operation from the operation terminal and processing in a remote parking control mode in which the vehicle is moved to a parking position and parked at the parking position based on the operation from the operation terminal, wherein in the processing step, learning completion information is stored in a storage unit as a learning history of a user of the operation terminal if the processing in the virtual parking control mode is executed, and in a state before the learning completion information is registered, execution of the remote parking control mode is limited, and after registration of the learning completion information, execution limitation of the remote parking control mode is canceled.

According to still another aspect of the present invention, there is provided a storage medium storing a program configured to cause a computer to execute a vehicle control method in a vehicle control apparatus capable of controlling movement and parking of a vehicle based on an operation from an operation terminal, the vehicle control method comprising:

a processing step of executing processing in a virtual parking control mode in which a virtual vehicle displayed on a screen is virtually operated by the operation from the operation terminal and processing in a remote parking control mode in which the vehicle is moved to a parking position and parked at the parking position based on the operation from the operation terminal, wherein in the processing step, learning completion information is stored in a storage unit as a learning history of a user of the operation terminal if the processing in the virtual parking control mode is executed, and in a state before the learning completion information is registered, execution of the remote parking control mode is limited, and after registration of the learning completion information, execution limitation of the remote parking control mode is canceled.

According to the present invention, it is possible to smoothly perform vehicle control of moving a vehicle to a predetermined parking position by an operation from an operation terminal and parking the vehicle at the parking position.

For example, even if a user has no learning experience of bodily feeling the behavior of a vehicle concerning vehicle control of moving a vehicle to a predetermined parking position by an operation from an operation terminal, he/she can experience, by learning, the behavior of the vehicle corresponding to an operation from a parking position. It is therefore possible to smoothly perform vehicle control of moving an actual vehicle to a predetermined parking position and parking the vehicle at the parking position.

DESCRIPTION OF THE EMBODIMENTS

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

Figure 1:
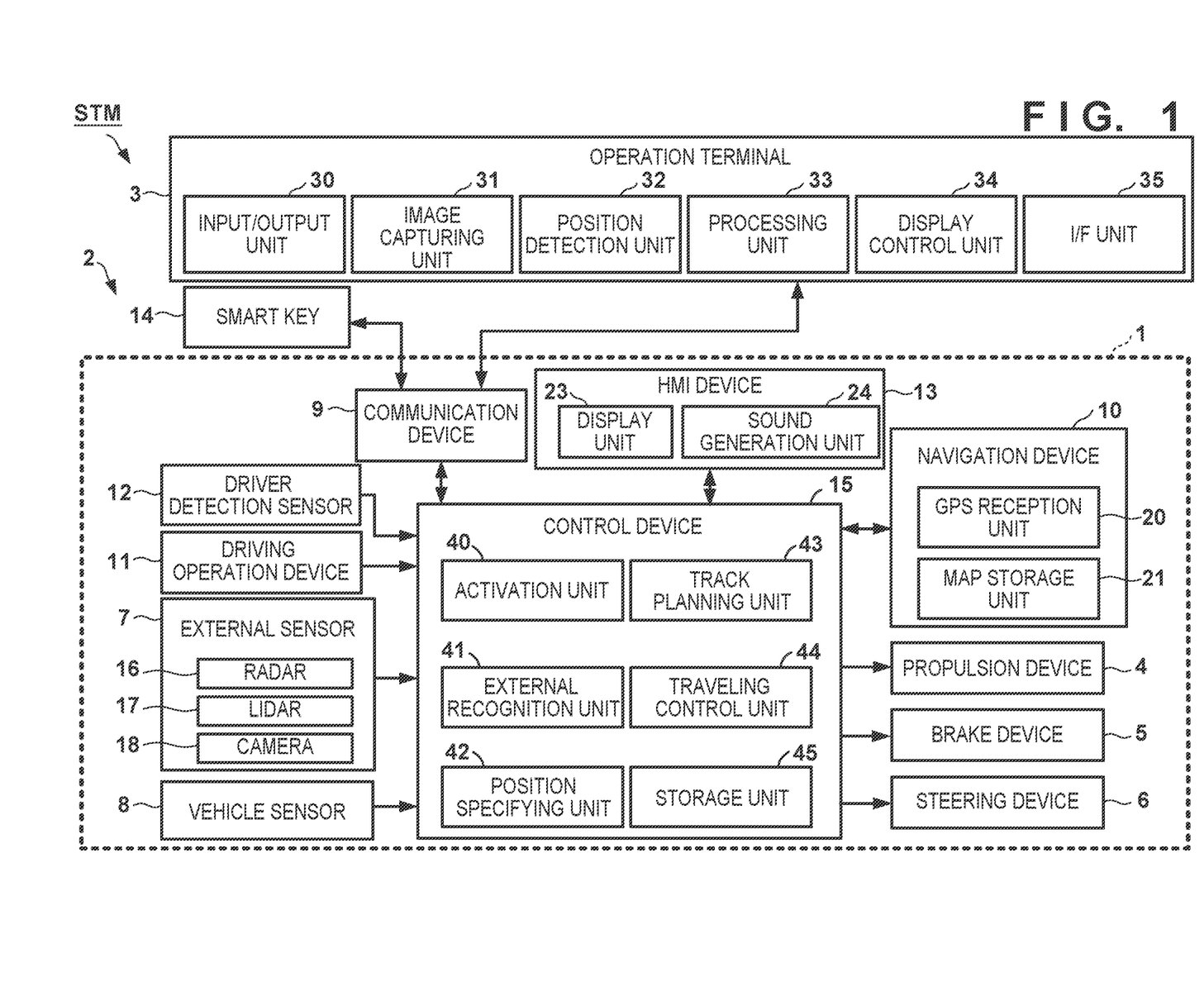
FIG. 1 is a block diagram showing the functional arrangement of a vehicle control system.

FIG. 1 is a block diagram showing the functional arrangement of a vehicle control system according to an embodiment. As shown in FIG. 1, a vehicle control system STM includes a vehicle system 2 mounted on a vehicle 1, and an operation terminal 3. The vehicle system 2 includes a propulsion device 4, a brake device 5, a steering device 6, an external sensor 7, a vehicle sensor 8, a communication device 9, a navigation device 10, a driving operation device 11, a driver detection sensor 12, an interface device (HMI device) 13, a smart key 14, and a control device 15. The components of the vehicle system 2 are connected to be able to transmit signals by an in-vehicle communication network such as a CAN (Controller Area Network).

The propulsion device 4 is a device that gives a driving force to the vehicle, and includes, for example, a power source and a transmission. The power source includes at least one of an electric motor and an internal combustion engine such as a gasoline engine or a diesel engine. The brake device 5 is a device that gives a braking force to the vehicle, and includes, for example, a brake caliper that presses a pad against a brake rotor, and an electric cylinder that supplies an oil pressure to the brake caliper. The brake device 5 includes a parking brake device that regulates the rotation of wheels by a wire cable. The steering device 6 is a device configured to change the steering angle of the wheels, and includes, for example, a rack-and-pinion mechanism that steers the wheels, and an electric motor that drives the rack-and-pinion mechanism. The propulsion device 4, the brake device 5, and the steering device 6 are controlled by the control device 15.

The external sensor 7 is a sensor that detects an object on the periphery of the vehicle, and the like. The external sensor 7 includes a radar 16, a LIDAR (Light Detection and Ranging) 17, and a camera 18, and outputs a detection result to the control device 15.

The radar 16 is, for example, a millimeter wave radar, and can detect an object around the vehicle and measure the distance to an object by a radio wave. A plurality of radars 16 are provided around the vehicle, and include, for example, one at the center of the front portion of the vehicle, one at each corner of the front portion, and one at each corner of the rear portion.

The LIDAR 17 can detect an object around the vehicle 1 and measure the distance to an object by light. A plurality of LIDARs 17 are provided around the vehicle, and include, for example, one at each corner of the front portion of the vehicle, one at the center of the rear portion, and one on each side of the rear portion.

The camera 18 is a device that captures the periphery of the vehicle, and is, for example, a digital camera using a solid-state image capturing element such as a CCD or a CMOS. The camera 18 includes a front camera that captures the front of the vehicle, and a rear camera that captures the rear. The camera 18 includes a pair of left and right door mirror cameras that are provided near the door mirror installation places of the vehicle and capture the rear of the left and right sides.

The vehicle sensor 8 includes a vehicle speed sensor that detects the speed of the vehicle, an acceleration sensor that detects an acceleration, a yaw rate sensor that detects the angular velocity about a vertical axis, and an azimuth sensor that detects the direction of the vehicle. The yaw rate sensor is, for example, a gyro sensor.

The communication device 9 mediates wireless communication between the control device 15 and the operation terminal 3. That is, the control device 15 can communicate with the operation terminal 3 held by a user via the communication device 9 using, for example, a communication method such as infrared communication or Bluetooth®.

The navigation device 10 is a device that acquires the current position of the vehicle and performs route guidance to a destination, and the like, and includes a GPS reception unit 20 and a map storage unit 21. The GPS reception unit 20 specifies the position (a latitude and a longitude) of the vehicle based on a signal received from an artificial satellite (positioning satellite). The map storage unit 21 is formed by a storage device such as a flash memory or a hard disk, and stores map information.

The driving operation device 11 is provided in a cabin, and accepts an input operation performed by the user to control the vehicle. The driving operation device 11 includes, as driving operation units, for example, a steering wheel, an accelerator pedal, a brake pedal, a parking brake device, and a push start switch (engine start switch). The push start switch accepts an input operation for activating the vehicle by a driving operation from the user. The driving operation device 11 includes a sensor that detects an operation amount, and outputs a signal representing the operation amount to the control device 15.

The driver detection sensor 12 is a sensor configured to detect whether a person is sitting on the driver's seat. The driver detection sensor 12 is, for example, a seating sensor provided on the seating surface of the driver's seat. The seating sensor may be of a capacitance type, or may be a membrane switch that is turned on when a person sits on the driver's seat. The driver detection sensor 12 may be an indoor camera that captures the user sitting on the driver's seat. The driver detection sensor 12 may be a sensor that acquires the presence/absence of insertion of the buckle of the tongue of the seat belt of the driver's seat and detects that a person sits on the driver's seat and wears the seat belt. The driver detection sensor 12 outputs a detection result to the control device 15.

The interface device (HMI device) 13 provides an interface (HMI: Human Machine Interface) between the user and the control device 15, notifies the user of various kinds of information by display or a sound, and accepts an input operation by the user. The interface device 13 includes a display unit 23 that is formed by a liquid crystal, organic EL, or the like and functions as a touch panel capable of accepting an input operation from the user, and a sound generation unit 24 such as a buzzer or a speaker.

The control device 15 is an electronic control unit (ECU) including a CPU, a nonvolatile memory (ROM), and a volatile memory (RAM). The control device 15 can execute various kinds of vehicle control by executing arithmetic processing based on a program by the CPU. At least some of the functional units of the control device 15 may be implemented by hardware such as an LSI, an ASIC, or an FPGA, or may be implemented by a combination of hardware and software.

The smart key 14 (FOB) is a wireless terminal that the user can carry, and is configured to be communicable with the control device 15 via the communication device 9 from the outside of the vehicle. The smart key 14 includes buttons used by the user to perform input. The user operates the buttons of the smart key 14, thereby performing lock of doors (door lock), unlock of doors (door unlock), activation of the vehicle, and the like.

The operation terminal 3 is a wireless terminal that the user can carry, and can communicate with the control device 15 via the communication device 9 from the outside of the vehicle.

As shown in FIG. 1, the operation terminal 3 includes, as functional components, an input/output unit 30, an image capturing unit 31, a position detection unit 32, a processing unit 33, a display control unit 34, and a wire connection port (I/F unit 35).

The input/output unit 30 presents information to the user who operates the operation terminal 3, and accepts input from the user who operates the operation terminal 3. The input/output unit 30 functions as, for example, a touch panel. Upon accepting input from the user, the input/output unit 30 outputs a signal corresponding to the input to the processing unit 33.

The image capturing unit 31 can capture an image (a still image or a moving image) in accordance with an image capturing mode set from the input/output unit 30. The image capturing unit 31 is, for example, a digital camera formed by a CMOS or the like. The processing unit 33 performs predetermined image processing for an image obtained by capturing the user who operates the operation terminal 3 to acquire a feature of the image, and compare the feature with the feature of the face image of the user registered in advance, thereby authenticating the user.

The position detection unit 32 includes a sensor capable of acquiring position information of the operation terminal 3. The position detection unit 32 can acquire the position of the operation terminal 3 by, for example, receiving a signal from a positioning satellite (GPS satellite). In addition, the position detection unit 32 can also acquire position information including the relative position of the operation terminal 3 with respect to the vehicle by communicating with the control device 15 via the communication device 9. The position detection unit 32 outputs the acquired position information to the processing unit 33.

The processing unit 33 transmits a terminal ID set in the operation terminal 3, a signal from the input/output unit 30, and position information acquired by the position detection unit 32 to the control device 15. Upon receiving a signal from the control device 15, the processing unit 33 processes the signal and causes the input/output unit 30 to present information to the user who operates the operation terminal 3. Information presentation is performed by, for example, display on the input/output unit 30.

If an external display device or an in-vehicle monitor is connected to the operation terminal 3, the display control unit 34 performs display control of operating a vehicle (virtual vehicle) displayed on the screen in synchronism with an operation from the operation terminal 3.

Upon detecting that a cable is connected between the operation terminal 3 and an external display device or the like, the wire connection port (I/F unit 35) outputs a cable connection signal to the processing unit 33.

In this embodiment, the operation terminal 3 is, for example, a portable information processing device (vehicle control apparatus) such as a smartphone. When a predetermined application is installed in the operation terminal 3 in advance, the operation terminal 3 functions as a vehicle control apparatus. When the application is installed, the operation terminal 3 (vehicle control apparatus) can communicate with the control device 15 and execute vehicle control (remote parking control) of moving the vehicle to a predetermined parking position by a remote operation.

As for vehicle control (remote parking control), the application supports two control modes (a virtual parking control mode and a remote parking control mode). The first control mode is the virtual parking control mode in which when an external display device or the like and the operation terminal 3 are connected, the display control unit 34 of the operation terminal 3 displays a vehicle (virtual vehicle) on the screen of the display device. If an operation input from the operation terminal 3 is absent, the display control unit 34 sets the vehicle (virtual vehicle) displayed on the screen in a standstill state. If an operation from the operation terminal 3 is input, the display control unit 34 operates the vehicle (virtual vehicle) on the screen in accordance with the input operation. The operation of the vehicle (virtual vehicle) is done in synchronism with the operation from the operation terminal 3. The display control unit 34 operates the vehicle (virtual vehicle) in accordance with the operation (for example, the direction (operation direction) of moving a finger on the input/output unit 30, the operation amount, the operation speed, and the like).

Even if the user has no learning experience of bodily feeling the behavior of the vehicle concerning vehicle control of moving the vehicle to a predetermined parking position by an operation from a portable terminal, he/she can experientially learn an operation feeling about an operation of the vehicle (virtual vehicle) corresponding to an operation from the portable terminal in the virtual parking control mode. It is therefore possible to smoothly perform vehicle control (remote parking control) by an actual vehicle (real vehicle).

Information (for example, a terminal ID including a predetermined numerical value or a character string for identifying each operation terminal) by which it is possible to identify the operation terminal 3 is set in the operation terminal 3. If predetermined learning is completed in the virtual parking control mode, the processing unit 33 transmits the terminal ID and learning completion information to the server.

Upon receiving the terminal ID and the learning completion information, the server specifies the user and the vehicle of the user by the terminal ID. The server issues code information representing that the learning completion is approved, and transmits the code information to the processing unit 33 of the operation terminal 3 and the control device 15 of the user vehicle that is the control target. The schematic procedure of processing in the vehicle control system concerning the virtual parking control mode will be described later with reference to FIG. 2.

The second control mode is the remote parking control mode in which vehicle control (remote parking control) by the real vehicle is executed. As a prerequisite to execute remote parking control, the user needs to complete learning (tutorial) in advance in the virtual parking control mode. In a state before the learning completion in the virtual parking control mode, execution of vehicle control (remote parking control) is limited. The execution limitation of remote parking control is canceled based on the learning completion.

To do pairing between the vehicle and the operation terminal 3, the operation terminal 3 transmits the code information transmitted from the server based on the approval of learning completion, and the terminal ID to the control device 15 of the vehicle. The control device 15 of the vehicle can authenticate the operation terminal 3 (terminal ID) based on the code information. When the control device 15 completes authentication of the operation terminal 3, pairing is established between the operation terminal 3 and the control device 15 of the vehicle. The control device 15 can execute vehicle control in the remote parking control mode in accordance with an operation from the operation terminal 3. The schematic procedure of processing in the vehicle control system concerning the remote parking control mode will be described later with reference to FIG. 3.

(Virtual Parking Control Mode: First Control Mode)

Figure 2:
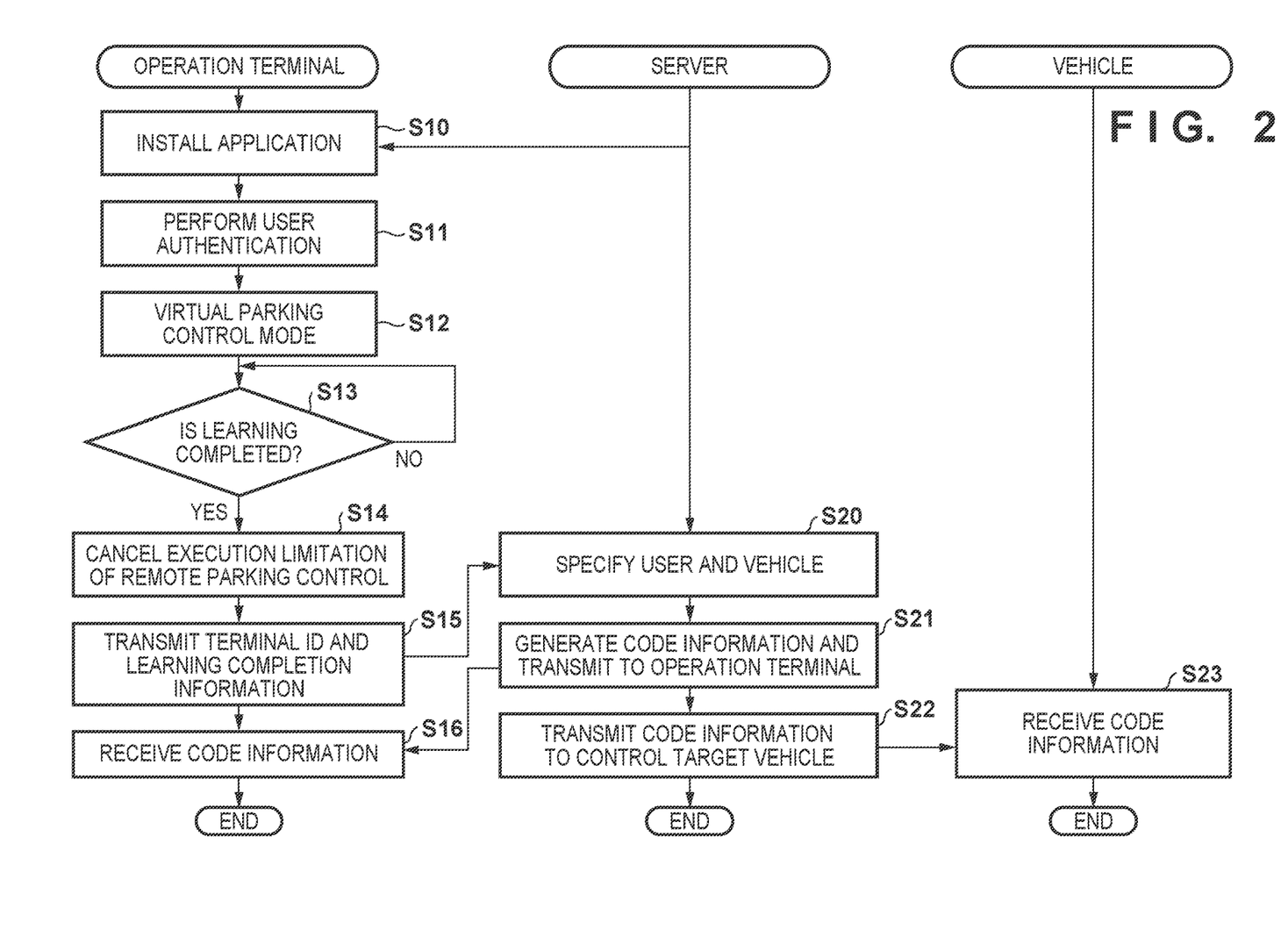
FIG. 2 is a flowchart for explaining the schematic procedures of processes in an operation terminal and a server.

FIG. 2 is a flowchart for explaining the schematic procedures of processes in the operation terminal 3 and the server. First, in step S10, the user installs an application downloaded from the server in the operation terminal 3 to execute vehicle control (remote parking control). In step S11, the user performs user authentication to activate the application. As for user authentication, the user can be authenticated based on, for example, the face image of the user obtained by capturing the user by the image capturing unit 31. Alternatively, user authentication can be performed by inputting a predetermined password or PIN code.

When the application is activated, in step S12, the process transitions to the virtual parking control mode. In the virtual parking control mode, the user can virtually learn operations concerning vehicle control (remote parking control). Learning in the virtual parking control mode can be done by connecting the operation terminal 3 to an external display device (monitor) or an in-vehicle monitor. Here, the operation terminal 3 can be connected to an external display device (monitor) or an in-vehicle monitor by wired connection (for example, USB, HDMI®, or the like) or wireless connection (Bluetooth®, Wi-Fi, or the like).

In the virtual parking control mode, the display control unit 34 of the operation terminal 3 can control display on the display device (monitor) or the in-vehicle monitor. When the user performs a predetermined operation from the input/output unit 30, the display control unit 34 virtually operates the vehicle displayed on the screen in accordance with the operation amount. In this embodiment, learning means teaching of an operation method for virtually operating the vehicle (virtual vehicle) displayed on the screen by a predetermined operation from the input/output unit 30 in the virtual parking control mode. By this learning, the user can confirm, in advance, basic operation methods needed for performing remote parking control by an actual vehicle, for example, parking position search, selection of a found parking position, an instruction of a parking direction, a vehicle advance operation and a vehicle retreat operation at the time of parking, and the like, and can also virtually experience the motion (behavior) of the vehicle in synchronism with the operation to the input/output unit 30.

In learning of the operation methods, for example, a plurality of check items concerning the basic operations exist. When learning is ended for each check item, the history of the end of learning is recorded in the internal memory of the processing unit 33 on a check item basis. Hence, even if the learning is interrupted in the middle, the learning can be resumed from the interrupt point by referring to the history information recorded in the internal memory. If all check items are ended, the series of learning processes ends.

In the determination of step S13, the processing unit 33 determines whether all the check items are ended. If not all the check items are ended (NO in step S13), a learning completion waiting state is set.

On the other hand, if all the check items are ended in the determination of step S13 (YES in step S13), the processing unit 33 determines that the series of learning processes is ended, and advances the process to step S14.

In step S14, the processing unit 33 cancels execution limitation of vehicle control (remote parking control mode) by the actual vehicle (real vehicle) based on the learning completion in the virtual parking control mode. Before learning completion in the virtual parking control mode, a state in which execution of the remote parking control mode (second control mode) is limited is maintained. Based on the learning completion, the processing unit 33 cancels the execution limitation of the remote parking control mode.

In step S15, the processing unit 33 generates learning completion information representing learning completion and transmits the terminal ID of the operation terminal 3 and the learning completion information to the server.

In addition, the operation terminal 3 records the generated learning completion information in the internal memory (storage unit). The registration of learning completion information is internal information of the learning history representing that the user has already learned. When the internal memory is referred to, and the learning completion information is registered, it can be determined that the user of the operation terminal 3 has already learned.

If the learning completion information is registered in the internal memory, the user can select one of the virtual parking control mode and the remote parking control mode, and the processing unit 33 can execute processing based on the selected control mode. That is, once the user completes learning in the virtual parking control mode, he/she can select one of the two control modes supported by the application from the next time.

The number of times of learning in the virtual parking control mode is not limited to one. The user can perform learning in the virtual parking control mode a plurality of times and practice the operation method of the vehicle in synchronism with the operation to the input/output unit 30.

Note that the processing unit 33 can also evaluate a learning result and display the evaluation result on the screen of an external display device (monitor) or an in-vehicle monitor or on the screen of the input/output unit 30. For example, when parking the vehicle (virtual vehicle) at a predetermined parking position by advance or retreat, the evaluation result of learning can be displayed on the screen using an evaluation item such that whether the virtual vehicle could be moved into an allowable parking area serving as a reference, or the relative positional relationship between the allowable parking area and the position to which the virtual vehicle was moved (for example, the position shift amount, the area of the virtual vehicle moved into the allowable parking area, or the like). When an objective evaluation result is presented to the user, the level of skill of the user when executing the remote parking control mode can be further improved.

In step S20, the server refers to a database based on the terminal ID, and specifies the user of the terminal ID and the vehicle of the user. As information corresponding to the terminal ID, the user and the vehicle information (for example, the model, the chassis number, and the like) of the user are registered in the database of the server. Based on the terminal ID transmitted from the operation terminal 3, the server can specify the user and the vehicle of the user, which are registered in the database. Here, the terminal ID is used as the information for specifying the user and the vehicle of the user. However, the information is not limited to this example. Unique identification information for specifying the user may be set in advance, and the user and the vehicle of the user may be specified based on the identification information of the user in place of the terminal ID.

In step S21, the server generates code information representing the approval of learning completion to the specified user and transmits the code information to the operation terminal 3 of the terminal ID of the transmission source.

In step S22, the server transmits the code information generated in step S21 to the vehicle of the user. In step S23, the control device 15 of the vehicle receives, via the communication device 9, the code information transmitted from the server. Here, the vehicle of the user is the control target vehicle in the remote parking control mode (second control mode).

On the other hand, in the processing on the side of the operation terminal 3, in step S16, the processing unit 33 receives the code information from the server and registers it in the internal memory (storage unit). The registration of code information is information of the approval history representing that the learning completion of the user has already been approved by the server. When the internal memory is referred to, and the code information is registered, it can be determined that the learning completion of the user has already been approved by the server. The code information is used as information for performing pairing between the vehicle and the operation terminal 3 at the time of execution of vehicle control (remote parking control mode) by the real vehicle.

(Remote Parking Control Mode: Second Control Mode)

Figure 3:
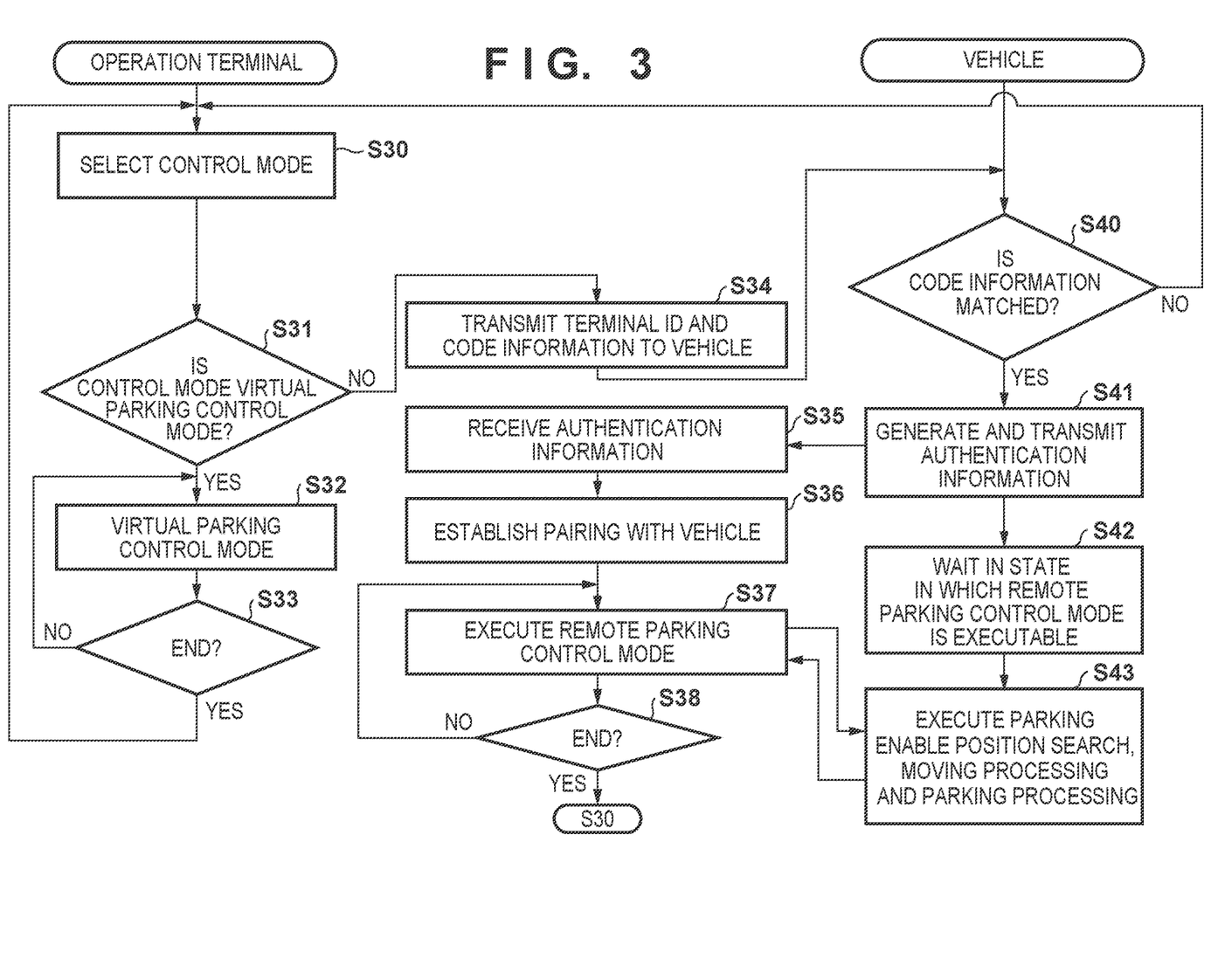
FIG. 3 is a flowchart for explaining the schematic procedures of processes in the operation terminal and a vehicle.

FIG. 3 is a flowchart for explaining the schematic procedures of processes in the operation terminal 3 and a vehicle. First, in step S30, the user selects a control mode. If learning completion information is registered in the internal memory, the user can select one of the virtual parking control mode and the remote parking control mode. The processing unit 33 can execute processing based on the selected control mode.

In step S31, the processing unit 33 determines whether the control mode selected in step S30 is the virtual parking control mode.

If the selected control mode is the virtual parking control mode (YES in step S31), in step S32, the processing unit 33 executes processing in the virtual parking control mode. This processing is similar to that in step S12 of FIG. 2 described above. When the user performs a predetermined operation from the input/output unit 30 of the operation terminal 3, the display control unit 34 virtually moves the vehicle displayed on the screen in accordance with the operation amount. By this learning, the user can learn basic operation methods in remote parking control mode, for example, selection of a parking position, an instruction of a parking direction, a vehicle advance operation, and a vehicle retreat operation, and can also learn (experience) the motion of the vehicle (virtual vehicle) in synchronism with the operation to the input/output unit 30.

In step S33, it is determined whether to end the processing in the virtual parking control mode. If the processing is not to be ended (NO in step S33), the process returns to step S32, and the processing unit 33 continues the processing in the virtual parking control mode. If processing in the remote parking control mode is to be executed during the processing in the virtual parking control mode, the processing in the virtual parking control mode needs to be ended.

If the processing in the virtual parking control mode is to be ended in the end determination in step S33 (YES in step S33), the processing unit 33 returns the process to step S30. If the remote parking control mode is selected in step S30 (NO in step S31), the process advances to step S34.

In step S34, to perform pairing between the vehicle and the operation terminal 3, the operation terminal 3 transmits the code information received from the server (step S16 of FIG. 2) and the terminal ID to the control device 15 of the vehicle.

On the other hand, in the processing on the vehicle side, in step S40, the control device 15 compares the code information received from the server (step S23 of FIG. 2) with the code information transmitted from the operation terminal 3 (step S34). If the pieces of code information do not match (NO in step S40), the control device 15 determines that the processing in the remote parking control mode cannot be executed, and returns the process to step S30.

(Limitation of Executable Control Modes)

When learning completion information is registered in the internal memory, a limitation is imposed on executable control modes in the following cases even if the execution limitation of the remote parking control mode is canceled.

If Pairing is not Established

Although the execution limitation of the remote parking control mode is canceled on the side of the operation terminal 3, pairing is not established because the pieces of code information do not match, and processing in the remote parking control mode cannot be executed on the vehicle side. In this case, in step S30, the processing unit 33 sets only the virtual parking control mode as an executable control mode.

Based on Determining Whether Operation Terminal 3 can Perform Wireless Communication As for the limitation of executable control modes, the processing unit 33 can change the setting of executable control modes not only in a case in which pairing is not established but also based on, for example, determining whether the operation terminal 3 can perform wireless communication.

Figure 4:
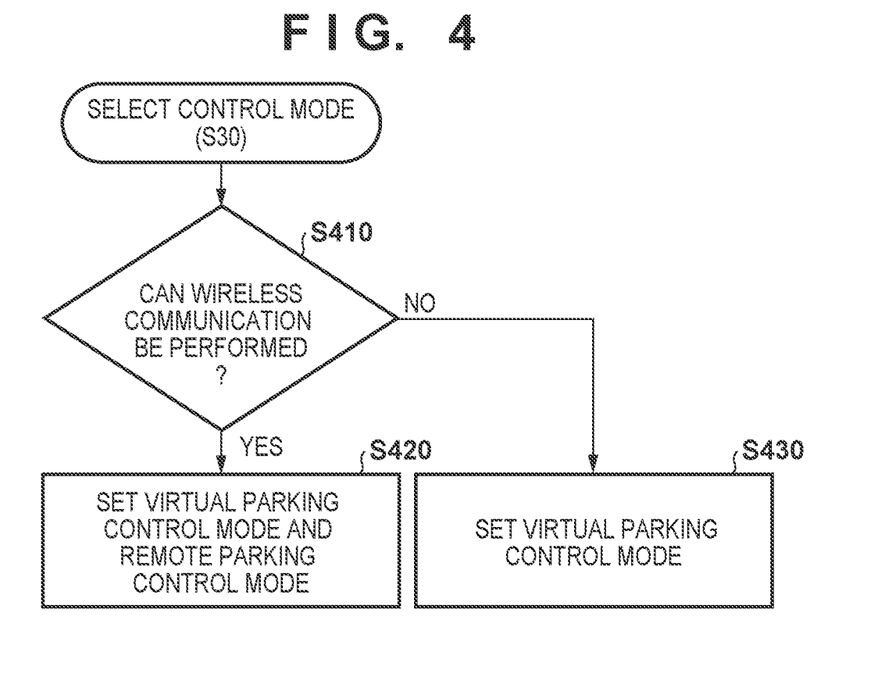
FIG. 4 is a flowchart for explaining the procedure of control mode setting processing based on determining whether the operation terminal can perform wireless communication.

FIG. 4 is a flowchart for explaining the procedure of control mode setting processing based on determining whether the operation terminal can perform wireless communication. The processing unit 33 can determine whether the operation terminal 3 can perform wireless communication depending on whether the communication speed (communication rate) is equal to or more than a predetermined threshold in the setting of the operation terminal 3 at the time of activation or in the communication environment of the operation terminal 3.

For example, if the switch of wireless communication including short distance wireless communication (Bluetooth®) is set to OFF, or the communication speed (communication rate) is less than a threshold at the time of activation of the operation terminal 3, the processing unit 33 determines that the operation terminal cannot communicate with the vehicle by wireless communication (NO in step S410), advances the process to step S430, and sets the virtual parking control mode as an executable control mode.

On the other hand, if the operation terminal 3 can perform wireless communication in the determination of step S410 (YES in step S410), the processing unit 33 advances the process to step S420, and sets the virtual parking control mode and the remote parking control mode as executable control modes. In this case, the user can select the control mode from the virtual parking control mode and the remote parking control mode. For example, if the communication speed is equal to or more than the threshold, the processing unit 33 determines that the operation terminal 3 can communicate with the vehicle by wireless communication, and sets the virtual parking control mode and the remote parking control mode as executable control modes.

Based on Connection State of Wire Connection Port

Figure 5:
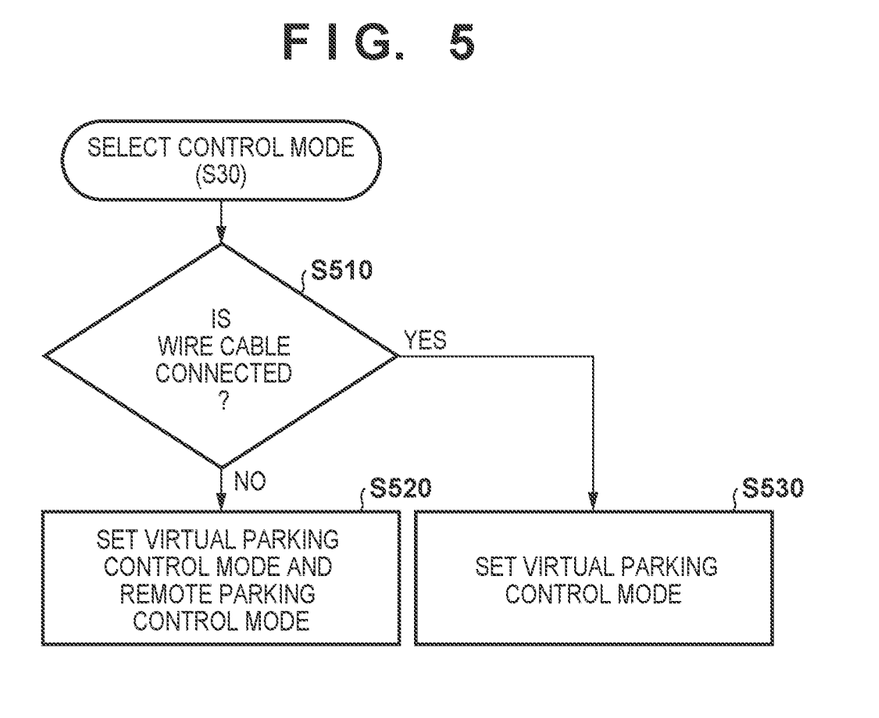
FIG. 5 is a flowchart for explaining the procedure of control mode setting processing based on determining whether a wire cable is connected to a wire connection port of the operation terminal.

As for the limitation of executable control modes, the processing unit 33 can change the setting of executable control modes not only in a case in which pairing is not established and based on determining whether wireless communication is possible but also based on, for example, determining whether a wire cable is connected to the wire connection port (I/F unit 35) such as a USB port or an HDMI port of the operation terminal 3.

FIG. 5 is a flowchart for explaining the procedure of control mode setting processing based on determining whether a wire cable is connected to the wire connection port (1/F unit 35) of the operation terminal 3. Upon detecting that a cable is connected, the wire connection port (I/F unit 35) outputs a cable connection signal to the processing unit 33. The processing unit 33 can determine, based on the presence/absence of reception of the cable connection signal, whether a wire cable is connected to the wire connection port (I/F unit 35).

If it is determined, based on the reception of the cable connection signal, that a wire cable is connected to the wire connection port (1/F unit 35) (YES in step S510), for example, if the in-vehicle monitor and the operation terminal 3 are connected by a wire cable, the possibility that the user gets off the vehicle and operates the operation terminal 3 is low. In this case, the processing unit 33 advances the process to step S530 and sets the virtual parking control mode as an executable control mode.

On the other hand, in the determination of step S510, if a cable connection signal is not received, the processing unit 33 determines that wire connection is absent (NO in step S510). The processing unit 33 advances the process to step S520 and sets the virtual parking control mode and the remote parking control mode as executable control modes. In this case, the user can select the control mode from the virtual parking control mode and the remote parking control mode.

Returning back to the determination processing of step S40 in FIG. 3, the control device 15 compares the code information received from the server (step S23 of FIG. 2) with the code information transmitted from the operation terminal 3 (step S34). If the pieces of code information match (YES in step S40), the process advances to step S41. The control device 15 generates authentication information representing that the pieces of code information match, and transmits the generated authentication information to the operation terminal 3 via the communication device 9.

In step S42, the control device 15 sets a state in which the remote parking control mode is executable, and waits.

On the other hand, on the side of the operation terminal 3, if the processing unit 33 receives the authentication information from the vehicle in accordance with matching of the code information in step S35, pairing is established between the vehicle and the operation terminal 3 (step S36). When pairing is established, processing in the remote parking control mode can be executed between the operation terminal 3 and the vehicle (step S37).

When the processing unit 33 instructs the vehicle to execute the remote parking control mode in step S37, in step S43, the control device 15 of the vehicle executes parking enable position search, moving processing of moving the vehicle to a parking position, and parking processing of parking the vehicle at the parking position.

In steps S37 and S43, two-way communication can be performed between the operation terminal 3 and the vehicle, and the result of parking enable position search performed on the vehicle side is transmitted to the side of the operation terminal 3. The input/output unit 30 of the operation terminal 3 transmits the designation of the parking position and an operation amount used to move to the designated parking position.

When the user swipes on the input/output unit 30 of the operation terminal 3, the operation terminal 3 transmits an operation amount signal corresponding to the swipe amount to the control device 15 of the vehicle. The control device 15 converts the operation amount signal into the moving amount of the vehicle, and performs moving processing of moving the vehicle along a track by the calculated moving amount until reaching the parking position. The control device 15 determines, in the moving processing, whether the vehicle has reached the parking position, and upon determining that the vehicle has reached the parking position, performs parking processing of parking the vehicle. If the stop of the vehicle is completed in the parking processing, the control device 15 transmits a parking completion notification representing the completion of parking to the operation terminal 3.

Upon receiving the parking completion notification, the operation terminal 3 displays, on the input/output unit 30 of the operation terminal 3, a notification representing that parking is completed.

In step S38, the processing unit 33 performs end determination of the processing in the remote parking control mode. If the processing is to be continued (NO in step S38), the processing of step S37 is continued. On the other hand, to end the processing in the remote parking control mode in step S38 (YES in step S38), the processing unit 33 returns the process to step S30, and ends the application in the operation terminal 3. The processing in the remote parking control mode is thus completed.

(Remote Parking Control Mode by Real Vehicle)

A vehicle-side arrangement for executing the remote parking control mode will be described next. The control device 15 can drive the vehicle based on a signal from the operation terminal 3. The control device 15 can also perform remote parking by moving the vehicle to a predetermined position. To control the vehicle, the control device 15 includes at least an activation unit 40, an external recognition unit 41, a position specifying unit 42, a track planning unit 43, a traveling control unit 44, and a storage unit 45.

The activation unit 40 authenticates the smart key 14 based on a signal from the push start switch, and determines whether the smart key 14 exists in the vehicle. When the smart key 14 is authenticated, and the smart key 14 exists in the vehicle, the activation unit 40 starts driving the propulsion device 4.

Alternatively, upon receiving, from the operation terminal 3, a signal for instructing activation, the activation unit 40 authenticates the operation terminal 3, and if the operation terminal 3 is authenticated, starts driving the vehicle. When starting drive of the vehicle, if the propulsion device 4 includes an internal combustion engine, the activation unit 40 turns on a spark device (ignition).

Based on the detection result of the external sensor 7, the external recognition unit 41 recognizes, for example, an obstacle such as a parked vehicle or a wall existing on the periphery of the vehicle, and acquires information such as a position and a size concerning the obstacle. In addition, the external recognition unit 41 analyzes an image acquired by the camera 18 by an image analysis method such as pattern matching, and acquires the presence/absence of an obstacle and its size. Also, the external recognition unit 41 can calculate the distance to an obstacle using signals from the radars 16 and the LIDARs 17 and acquire the position of the obstacle.

The position specifying unit 42 can detect the position of the vehicle based on a signal from the GPS reception unit 20 of the navigation device 10. In addition to the signal from the GPS reception unit 20, the position specifying unit 42 can acquire a vehicle speed and a yaw rate from the vehicle sensor 8 and specify the position and posture of the vehicle using so-called inertial navigation.

The external recognition unit 41 can analyze the detection result of the external sensor 7, more specifically, an image captured by the camera 18 based on image analysis method such as pattern matching and acquire, for example, the position of a white line drawn on the road surface of a parking area or the like.

The traveling control unit 44 controls the propulsion device 4, the brake device 5, and the steering device 6 based on a traveling control instruction from the track planning unit 43 and makes the vehicle travel.

The storage unit 45 is formed by a RAM or the like, and stores information necessary for processing of the track planning unit 43 and the traveling control unit 44.

When input from the user to the interface device (HMI device) 13 or the operation terminal 3 is performed, the track planning unit 43 calculates a track serving as the traveling route of the vehicle as needed, and outputs a traveling control instruction to the traveling control unit 44.

After the vehicle is stopped, if an input for instructing processing in the remote parking control mode by a remote operation is performed by the user, the track planning unit 43 performs vehicle control processing corresponding to the remote parking control mode.

When performing vehicle control processing corresponding to the remote parking control mode, the track planning unit 43 first performs acquisition processing of acquiring a parking enable position. Based on a signal from the external sensor 7, the track planning unit 43 acquires the position and size of each obstacle and the positions of white lines drawn on the road surface. The track planning unit 43 extracts a space where parking is possible (to be referred to as a parking enable position hereinafter) based on the positions and sizes of the obstacles and the white lines. When a desired parking position is input from the user, the track planning unit 43 calculates a track from the current location of the vehicle to the parking position.

When the user swipes on the screen display of the input/output unit 30 of the operation terminal 3, the operation terminal 3 transmits an operation amount signal corresponding to the swipe amount to the track planning unit 43. The track planning unit 43 converts the operation amount signal into the moving amount of the vehicle, and performs moving processing of moving the vehicle along the track by the calculated moving amount until reaching the parking position.

The track planning unit 43 determines, in the moving processing, whether the vehicle has reached the parking position, and upon determining that the vehicle has reached the parking position, performs parking processing of parking the vehicle. In the parking processing, the track planning unit 43 first drives the brake device 5 of the traveling control unit 44. After that, the track planning unit 43 drives the parking brake of the traveling control unit 44. When the stop of the vehicle is completed, the track planning unit 43 transmits a parking completion notification representing that parking is completed to the operation terminal 3.

Upon receiving the parking completion notification, the operation terminal 3 displays, on the input/output unit 30 of the operation terminal 3, a notification representing that parking is completed, and ends the application in the operation terminal 3. Vehicle control processing corresponding to the remote parking control mode is thus completed.

Other Embodiments

Learning completion information may be communicated via local communication between the operation terminal 3 and the vehicle 1 without interposing a network. A vehicle control program that implements one or more functions described in the embodiments is supplied to a system or an apparatus via a network or a storage medium, and one or more processors in the computer of the system or the apparatus can read out the program and execute it. The present invention can also be implemented by this aspect.

Summary of Embodiment

The embodiment discloses at least the following arrangements.

Arrangement 1. A vehicle control apparatus according to the above-described embodiment is a vehicle control apparatus (for example, 3, 33 in FIG. 1) capable of controlling movement and parking of a vehicle based on an operation from an operation terminal (for example, 3 in FIG. 1), comprising:

a processing unit (for example, 33 in FIG. 1) configured to execute processing in a virtual parking control mode in which a virtual vehicle displayed on a screen is virtually operated by the operation from the operation terminal (3) and processing in a remote parking control mode in which the vehicle is moved to a parking position and parked at the parking position based on the operation from the operation terminal (3), wherein the processing unit (33)

registers learning completion information as a learning history of a user of the operation terminal (3) if the processing in the virtual parking control mode is executed, and in a state before the learning completion information is registered, limits execution of the remote parking control mode, and after registration of the learning completion information, cancels execution limitation of the remote parking control mode.

According to the vehicle control apparatus of Arrangement 1, it is possible to smoothly perform vehicle control of moving the vehicle to a predetermined parking position by the operation from the operation terminal and parking the vehicle at the parking position. For example, even if the user has no learning experience of bodily feeling the behavior of the vehicle concerning vehicle control of moving the vehicle to a predetermined parking position by the operation from the operation terminal, he/she can experience, by learning, the behavior of the vehicle corresponding to the operation from the parking position. It is therefore possible to smoothly perform vehicle control of moving the actual vehicle to a predetermined parking position and parking the vehicle at the parking position.

Arrangement 2. In the vehicle control apparatus (3, 33) according to the above-described embodiment, the processing unit (33) comprises a storage unit configured to register the learning completion information as the learning history of the user, and if the storage unit is referred to, and the learning completion information is registered, the processing unit (33) determines that the user has already learned a processing method in the virtual parking control mode.

According to the vehicle control apparatus of Arrangement 2, the registration of learning completion information is internal information of the learning history representing that the user has already learned. When the internal memory is referred to, and the learning completion information is registered, it can be determined that the user of the operation terminal has already learned.

Arrangement 3. In the vehicle control apparatus (3, 33) according to the above-described embodiment, if the learning completion information is registered, the processing unit (33) sets the virtual parking control mode and the remote parking control mode as executable control modes.

According to the vehicle control apparatus of Arrangement 3, if the learning completion information is registered in the internal memory, the user can select one of the virtual parking control mode and the remote parking control mode as an executable control mode, and the processing unit can execute processing based on the selected control mode. That is, once the user completes learning in the virtual parking control mode, he/she can select one of the two control modes supported by the application from the next time.

Arrangement 4. In the vehicle control apparatus (3, 33) according to the above-described embodiment, if pairing is not established between the operation terminal (3) and the vehicle because of mismatching between code information transmitted from a server to the vehicle and code information transmitted from the operation terminal (3) to the vehicle, the processing unit (33) sets the virtual parking control mode as an executable control mode.

According to the vehicle control apparatus of Arrangement 4, even when the learning completion information is registered, and the execution limitation of the remote parking control mode is thus canceled, if pairing is not established between the operation terminal and the vehicle, wireless communication cannot be performed with the vehicle. Hence, the processing unit can set the virtual parking control mode as an executable control mode and activate it.

Arrangement 5. In the vehicle control apparatus (3, 33) according to the above-described embodiment, if pairing is established between the operation terminal (3) and the vehicle because of matching between code information transmitted from a server to the vehicle and code information transmitted from the operation terminal (3) to the vehicle, the processing unit (33) of the operation terminal executes processing in the remote parking control mode with the vehicle.

According to the vehicle control apparatus of Arrangement 5, when the learning completion information is registered, and the execution limitation of the remote parking control mode is thus canceled, and pairing is established between the operation terminal and the vehicle, wireless communication can be performed with the vehicle. Hence, the processing unit can execute processing in the remote parking control mode.

Arrangement 6. In the vehicle control apparatus (3, 33) according to the above-described embodiment, the processing unit (33) determines whether the operation terminal (3) can perform wireless communication depending on whether the communication speed is not less than a predetermined threshold in a communication environment of the operation terminal (3), and if the communication speed is less than the threshold, the processing unit (33) determines that communication with the vehicle cannot be performed by wireless communication, and sets the virtual parking control mode as an executable control mode.

According to the vehicle control apparatus of Arrangement 6, even when the learning completion information is registered, and the execution limitation of the remote parking control mode is thus canceled, if the communication speed is less than the predetermined threshold in the communication environment of the operation terminal, the processing unit determines that communication with the vehicle cannot stably be performed by wireless communication. The processing unit can set the virtual parking control mode as an executable control mode and activate it.

Arrangement 7. In the vehicle control apparatus (3, 33) according to the above-described embodiment, if the communication speed is not less than the threshold, the processing unit (33) determines that communication with the vehicle can be performed by wireless communication, and sets the virtual parking control mode and the remote parking control mode as executable control modes.

According to the vehicle control apparatus of Arrangement 7, if the communication speed is not less than the predetermined threshold, the processing unit determines that communication with the vehicle can stably be performed by wireless communication, and sets the virtual parking control mode and the remote parking control mode as executable control modes. Hence, the user can select one of the two control modes supported by the application.

Arrangement 8. The vehicle control apparatus (3, 33) according to the above-described embodiment further comprises a wire connection unit (for example, 35 in FIG. 1) configured to, upon detecting that a cable is connected, output a cable connection signal to the processing unit (33), wherein if it is determined, based on reception of the cable connection signal, that the cable is connected to the wire connection unit (35), the processing unit (33) sets the virtual parking control mode as an executable control mode.

According to the vehicle control apparatus of Arrangement 8, even when the learning completion information is registered, and the execution limitation of the remote parking control mode is thus canceled, if a cable is connected to the operation terminal, the processing unit can set the virtual parking control mode as an executable control mode and activate it. In this case, the virtual parking control mode can be activated with priority over the remote parking control mode.

Arrangement 9. A vehicle control method of a vehicle control apparatus according to the above-described embodiment is a vehicle control method in a vehicle control apparatus (for example, 3, 33 in FIG. 1) capable of controlling movement and parking of a vehicle based on an operation from an operation terminal (for example, 3 in FIG. 1), comprising:

a processing step (for example, S32, S37 in FIG. 3) of executing processing in a virtual parking control mode in which a virtual vehicle displayed on a screen is virtually operated by the operation from the operation terminal (3) and processing in a remote parking control mode in which the vehicle is moved to a parking position and parked at the parking position based on the operation from the operation terminal (3), wherein in the processing step, learning completion information is stored in a storage unit as a learning history of a user of the operation terminal (3) if the processing in the virtual parking control mode is executed, and in a state before the learning completion information is registered, execution of the remote parking control mode is limited (for example, S12 in FIG. 2), and after registration of the learning completion information, execution limitation of the remote parking control mode is canceled (for example, S14 in FIG. 2).

Arrangement 10. A storage medium storing a program according to the above-described embodiment is a storage medium storing a program configured to cause a computer to execute a vehicle control method in a vehicle control apparatus (for example, 3, 33 in FIG. 1) capable of controlling movement and parking of a vehicle based on an operation from an operation terminal (for example, 3 in FIG. 1), the vehicle control method comprising:

a processing step (for example, S32, S37 in FIG. 3) of executing processing in a virtual parking control mode in which a virtual vehicle displayed on a screen is virtually operated by the operation from the operation terminal (3) and processing in a remote parking control mode in which the vehicle is moved to a parking position and parked at the parking position based on the operation from the operation terminal (3), wherein in the processing step, learning completion information is stored in a storage unit as a learning history of a user of the operation terminal (3) if the processing in the virtual parking control mode is executed, and in a state before the learning completion information is registered, execution of the remote parking control mode is limited (for example, S12 in FIG. 2), and after registration of the learning completion information, execution limitation of the remote parking control mode is canceled (for example, S14 in FIG. 2).

According to the vehicle control method of Arrangement 9 and the storage medium storing the program of Arrangement 10, it is possible to smoothly perform vehicle control of moving the vehicle to a predetermined parking position by the operation from the operation terminal and parking the vehicle at the parking position. For example, even if the user has no learning experience of bodily feeling the behavior of the vehicle concerning vehicle control of moving the vehicle to a predetermined parking position by the operation from the operation terminal, he/she can experience, by learning, the behavior of the vehicle corresponding to the operation from the parking position. It is therefore possible to smoothly perform vehicle control of moving the actual vehicle to a predetermined parking position and parking the vehicle at the parking position.

The invention is not limited to the foregoing embodiments, and various variations/changes are possible within the spirit of the invention.

What is claimed is:

1. A vehicle control apparatus capable of controlling movement and parking of a vehicle based on an operation from an operation terminal, comprising:

a processing unit configured to execute processing in a virtual parking control mode in which a virtual vehicle displayed on a screen is virtually operated by the operation from the operation terminal and configured to execute processing in a remote parking control mode in which the vehicle is moved to a parking position and parked at the parking position based on the operation from the operation terminal, wherein the processing unit registers learning completion information comprising a learning history of a user of the operation terminal if the processing in the virtual parking control mode is executed, the learning completion information indicating that the user has completed the virtual operation in the virtual parking control mode, and limits execution of the remote parking control mode in a state before the learning completion information is registered, and cancels execution limitation of the remote parking control mode after registration of the learning completion information.

2. The apparatus according to claim 1, wherein the processing unit comprises a storage unit configured to register the learning completion information as the learning history of the user, and if the storage unit is referred to, and the learning completion information is registered, the processing unit determines that the user has already learned a processing method in the virtual parking control mode.

3. The apparatus according to claim 1, wherein if the learning completion information is registered, the processing unit sets the virtual parking control mode and the remote parking control mode as executable control modes.

4. The apparatus according to claim 1, wherein if pairing is not established between the operation terminal and the vehicle because of mismatching between code information transmitted from a server to the vehicle and code information transmitted from the operation terminal to the vehicle, the processing unit sets the virtual parking control mode as an executable control mode.

5. The apparatus according to claim 1, wherein if pairing is established between the operation terminal and the vehicle because of matching between code information transmitted from a server to the vehicle and code information transmitted from the operation terminal to the vehicle, the processing unit of the operation terminal executes processing in the remote parking control mode with the vehicle.

6. The apparatus according to claim 1, wherein the processing unit determines whether the operation terminal can perform wireless communication depending on whether the communication speed is not less than a predetermined threshold in a communication environment of the operation terminal, and if the communication speed is less than the threshold, the processing unit determines that communication with the vehicle cannot be performed by wireless communication, and sets the virtual parking control mode as an executable control mode.

7. The apparatus according to claim 6, wherein if the communication speed is not less than the threshold, the processing unit determines that communication with the vehicle can be performed by wireless communication, and sets the virtual parking control mode and the remote parking control mode as executable control modes.

8. The apparatus according to claim 1, further comprising a wire connection unit configured to, upon detecting that a cable is connected, output a cable connection signal to the processing unit, wherein if it is determined, based on reception of the cable connection signal, that the cable is connected to the wire connection unit, the processing unit sets the virtual parking control mode as an executable control mode.

9. A vehicle control method in a vehicle control apparatus capable of controlling movement and parking of a vehicle based on an operation from an operation terminal, comprising:
- a processing step of executing processing in a virtual parking control mode in which a virtual vehicle displayed on a screen is virtually operated by the operation from the operation terminal and executing processing in a remote parking control mode in which the vehicle is moved to a parking position and parked at the parking position based on the operation from the operation terminal,
- wherein in the processing step,
  - learning completion information is stored in a storage unit as a learning history of a user of the operation terminal if the processing in the virtual parking control mode is executed, the learning completion information indicating that the user has completed the virtual operation in the virtual parking control mode, and
  - execution of the remote parking control mode is limited in a state before the learning completion information is registered, and
  - execution limitation of the remote parking control mode is canceled after registration of the learning completion information.

10. A non-transitory storage medium storing a program configured to cause a computer to execute a vehicle control method in a vehicle control apparatus capable of controlling movement and parking of a vehicle based on an operation from an operation terminal, the vehicle control method comprising:
- a processing step of executing processing in a virtual parking control mode in which a virtual vehicle displayed on a screen is virtually operated by the operation from the operation terminal and executing processing in a remote parking control mode in which the vehicle is moved to a parking position and parked at the parking position based on the operation from the operation terminal,
- wherein in the processing step,
  - learning completion information is stored in a storage unit, the learning completion information comprising a learning history of a user of the operation terminal if the processing in the virtual parking control mode is executed, the learning completion information indicating that the user has completed the virtual operation in the virtual parking control mode, and
  - execution of the remote parking control mode is limited in a state before the learning completion information is registered, and
  - execution limitation of the remote parking control mode is canceled after registration of the learning completion information.

* * * * *